Sept. 25, 1928.
H. WALTER
DIFFUSION REACTION
Filed May 1, 1926
1,685,759
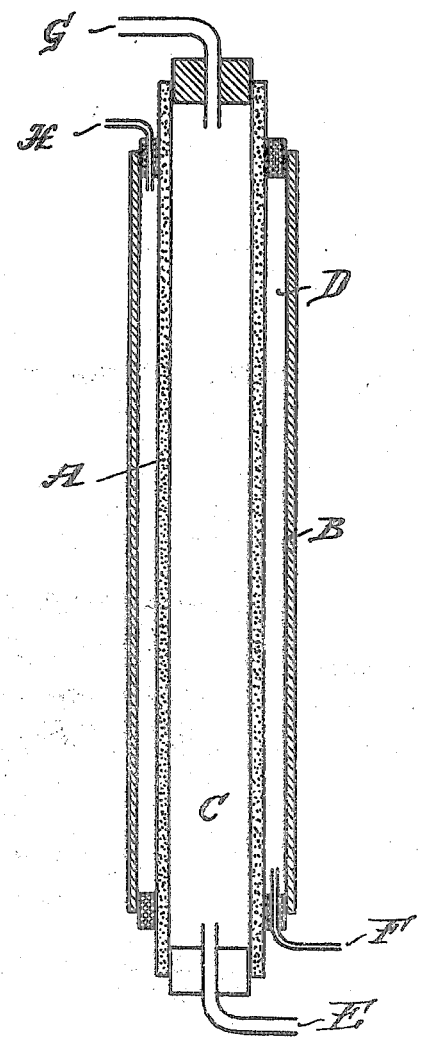
Inventor
Hans Walter,
By [signature] Atty.

Patented Sept. 25, 1928.

1,685,759

UNITED STATES PATENT OFFICE.

HANS WALTER, OF MAINZ-MOMBACH, GERMANY, ASSIGNOR TO VEREIN FÜR CHEMISCHE INDUSTRIE AKTIENGESELLSCHAFT, OF FRANKFORT-ON-THE-MAIN, GERMANY, A CORPORATION.

DIFFUSION REACTION.

Application filed May 1, 1926, Serial No. 106,103, and in Germany May 22, 1924.

The new process consists in a peculiar application of diffusion in order to accelerate chemical reactions between two or more gases which reactions progress practically slowly, or to effect such reactions, which upon the ordinary mixing of the gases do not take place to any substantial degree.

The peculiar application of diffusion consists in that the gases intended to react are brought to different sides of a porous partition. A form of execution of the process, which is specially adapted for many cases, consists in using a partition in which suitable catalyzers are embedded in such a manner that they extend through the entire thickness of the partition. According to a further improvement of process, gases are made to flow along both sides of the partition, preferably in counter-current.

A special form of carrying out the process in which there is utilized the feature of easy and uniform heating of the whole apparatus or one of its chambers, consists in that in one chamber the gases or the gas are or is generated by chemical reaction, said gas or gases being designed to come into reaction with the gas in the chamber on the other side of the partition.

Applicant has made the peculiar discovery that chemical reactions, which progress very slowly in a mixture of two gases, are considerably accelerated if the two gases are on the two sides of a porous partition while the mixing of the gases takes place in the pores of the partition. Acetaldehyde in the form of vapour and the oxygen of the air, for instance, react only very slowly in the free mixture, whilst if they are separated by a porous partition the reaction can be carried through quantitatively much more rapidly. The explanation for this phenomenon is that the diffusion of the two gases with one another occurring under these conditions through the partition on the capillary inner boundary of the partition, makes the gases encounter one another under other conditions than in a mixture in a free space. The effect may therefore be designated as catalytic in the meaning of the surface catalysis or adsorption catalysis, but it differs from these two known forms of catalysis in that the reaction components penetrate into one another unmixed on both sides of the catalyzing substance according to the laws of diffusion of the two gases and are positively conducted by the energy of diffusion towards one another. This diffusion speed will consequently be maintained at the maximum, if the diffusion and reaction product which in this case is not a mere mixture but contains also the product of the chemical reaction, is drawn off as rapidly as possible, e. g. if the gases are made to flow along the two surfaces of the partition. If the currents flow in opposite directions the reaction takes place most rapidly and most completely. The same result may be obtained by any other manner of removing the reaction products from the reacting gases.

The reaction process may be further improved by impregnating the whole partition with any specific catalyzer for the desired reaction, for instance ferric salts for the reaction of acetaldehyde and oxygen. In this case there will be the added advantage that the reacting gases can be brought, under these conditions, positively in contact with very large quantities of a specific catalyzer.

A practical advantage of the new process consists in the simplicity and durability of the apparatus, as the catalyser within the partition fixed in the apparatus cannot be rubbed off, as will happen if several surface coated carriers are loosely heaped in a receptacle.

If more than two gases have to be dealt with, e. g. if there is, at least on one side of the diaphragm, a mixture of two gases, the dialyzing effect of the diaphragm, known per se, will be added to the diffusion effects described if the components of the mixed gas have different molecular sizes. In this case only one component of the mixture will essentially penetrate into the partition and react in the same with the gas or component of a mixture coming from the other side.

A very simple apparatus for carrying out this process consists preferably of an inner compartment enclosed by a porous cylinder having an upper and lower pipe-connection and of an outer compartment enclosed by a gas tight metal wall into which end two tubes one at the top and the other at the bottom. In this manner it is possible to make the reactions take place under any desired pressure and to provide any desired heating, especially uniform heating, from the inner or outer tube.

An apparatus for carrying out the new process is shown, by way of example, in vertical section in the accompanying drawing, in which:

A is the porous diaphragm, B the gas tight envelope, C the inner compartment, D the outer compartment; E and G are the pipe connections of the inner compartment and F, H are the pipe connections of the outer compartment.

A catalytically acting partition for carrying out the process, impregnated with a special catalyzer, may be produced in the following manner:

A porous porcelain tube or an asbestos tube (obtained by rolling up moistened asbestos paper onto a glass rod, 5 mm. thick, and by subsequent drying) is well impregnated with a solution of 60 grams of crystallized nickel nitrate, 10 grams of copper nitrate, and 10 grams of borax in 500 cubic-centimeters of water, dried at a temperature as low as possible and then heated about ½ hour to approximately 400° C. The tube having been prepared in this manner is then built into the apparatus, said apparatus is then heated to 300 to 320° C. and hydrogen is conducted through the same at this temperature as long as water drops appear in the condenser.

The partition is especially adapted for carrying out the process as per examples 1 and 2. It is however known, that such partitions impregnated with catalyzers may be produced also in other manners and it is evident that the process may be modified easily with other catalyzers.

The extensive range of application of the new process may be further explained by the following examples:

Example 1: For the production of methanol a diaphragm is used consisting of a porous tube impregnated with a solution of 80 grams of nitrate of zinc, 10 grams of copper nitrate and 20 grams of borax in 500 cubic-centimeters of water. The tube is then well dried. At the pressure of 50 atm. above atmospheric carbon dioxide and hydrogen in a proportion of 1 to 6 is conducted in counter-current through the apparatus said apparatus being heated to about 380° C. The gases cooled under pressure deposit a liquid soluble in water which consists almost entirely of methanol, at an output of 8.5% of the theoretical output, and water.

Example 2: If sulphur dioxide and chlorine are conducted along the two surfaces of a diaphragm at a temperature of about 130° C. and atmospheric pressure sulphuryl chloride is produced in a yield of over 60%.

According to the new process the same pressure is applied as a rule on both sides of the partition. In special cases, if the partitions are thick or have fine pores, there may be applied on the one side a higher pressure, which, however, must not be so high, in relation to the diffusion pressure, that it forces the gas completely through the partition so that the gas on the other side of the partition is prevented from entering it.

I claim:—

1. The art of causing reactions between different gases or mixtures of gases that react but slowly in simple mixtures, which comprises separating the two gas volumes by a porous partition and under substantially the same pressures, so that the diffusion tendency of both volumes will cause their entrance into the partition to react therein, and the product to emerge from the partition under its diffusion pressure.

2. The art of causing reactions between different gases or mixtures of gases that react but slowly in simple mixtures, which comprises separating the two gas volumes by a porous partition and under substantially the same pressures, so that the diffusion tendency of both volumes will cause their entrance into the partition to react therein, and the product to emerge from the partition under its diffusion pressure on both sides of the partition.

3. The art of causing reactions between different gases or mixtures of gases that react but slowly or not at all in simple mixtures, which comprises separating the two gas volumes by a porous partition containing a catalyst and under substantially the same pressures, so that the diffusion tendency of both volumes will cause their entrance into the partition to react therein, and the product to emerge from the partition under its diffusion pressure.

In testimony whereof I affix my signature.

HANS WALTER.